(12) United States Patent  (10) Patent No.: US 8,464,634 B2
Cretors et al.  (45) Date of Patent: Jun. 18, 2013

(54) POPCORN MACHINES WITH TOPPING DISPENSING SYSTEMS AND ASSOCIATED METHODS OF USE AND MANUFACTURE

(75) Inventors: Charles D. Cretors, Lake Forest, IL (US); Nenad Vidojevic, Chesterton, IN (US)

(73) Assignee: C. Cretors & Company, Chicago, IL (US)

( * ) Notice: Subject to any disclaimer, the term of this patent is extended or adjusted under 35 U.S.C. 154(b) by 1303 days.

(21) Appl. No.: 12/191,159

(22) Filed: Aug. 13, 2008

(65) Prior Publication Data

US 2009/0056558 A1   Mar. 5, 2009

Related U.S. Application Data

(60) Provisional application No. 60/955,829, filed on Aug. 14, 2007.

(51) Int. Cl.
*A23L 1/18*    (2006.01)
(52) U.S. Cl.
USPC ...................................... 99/323.8; 99/323.5
(58) Field of Classification Search
USPC ............. 99/323.8, 323.9, 323.7, 323.6, 323.5
See application file for complete search history.

(56) References Cited

U.S. PATENT DOCUMENTS

| | | | |
|---|---|---|---|
| 188,905 | A | 3/1877 | Hildebrand |
| 513,635 | A | 1/1894 | Deverall |
| 1,045,964 | A | 12/1912 | Friese |
| 1,545,357 | A | 7/1925 | Schwimmer |
| 2,123,663 | A | 7/1938 | Roach |
| 2,554,802 | A * | 5/1951 | Waas .......................... 99/323.8 |
| 2,733,841 | A | 2/1956 | Waas |
| 2,812,704 | A | 11/1957 | Hawks |
| 2,856,841 | A | 10/1958 | Cretors et al. |
| 2,939,379 | A | 6/1960 | Schmitt |
| 3,097,610 | A | 7/1963 | Swanson |
| 3,606,905 | A | 9/1971 | Fehler |
| 3,628,893 | A | 12/1971 | Carpigiani et al. |
| 3,641,916 | A | 2/1972 | McDevitt et al. |

(Continued)

FOREIGN PATENT DOCUMENTS

| | | |
|---|---|---|
| CA | 682731 | 3/1964 |
| DE | 2938663 | 4/1981 |
| EP | 0364071 | 4/1990 |
| GB | 0688223 | 3/1953 |

OTHER PUBLICATIONS

"Topping & Dispensing Systems," C. Cretors and Company Product Brochure, pp. 36-39, published Oct. 2005.

(Continued)

*Primary Examiner* — Reginald L Alexander
(74) *Attorney, Agent, or Firm* — Perkins Coie LLP

(57) ABSTRACT

Popcorn machines having topping dispensing systems are disclosed herein. A popcorn machine configured in accordance with an embodiment of the disclosure includes a popping kettle or other popping apparatus positioned in a cabinet. The popping apparatus is configured to heat un-popped corn kernels and pop the corn kernels. After popping, the corn is held in the cabinet. The popcorn machine of this embodiment further includes a topping outlet positioned in the cabinet and a topping pump. The topping outlet is operably connectable to a topping container, and the topping pump is configured to move topping from the topping container through the topping outlet and onto a serving portion of popcorn in response to operator activation of the pump.

21 Claims, 14 Drawing Sheets

U.S. PATENT DOCUMENTS

| | | | |
|---|---|---|---|
| 3,724,723 A | | 4/1973 | Slavinski et al. |
| 3,739,953 A | | 6/1973 | Cretors |
| 3,783,820 A | | 1/1974 | Hautly et al. |
| RE27,920 E | | 2/1974 | Cole |
| 4,133,456 A | | 1/1979 | Corini |
| 4,152,974 A | | 5/1979 | Tienor |
| 4,166,208 A | | 8/1979 | Martel et al. |
| 4,171,667 A | * | 10/1979 | Miller et al. .................. 99/323.6 |
| 4,182,229 A | | 1/1980 | VandeWalker |
| 4,421,146 A | | 12/1983 | Bond et al. |
| 4,484,697 A | | 11/1984 | Fry, Jr. |
| 4,512,247 A | | 4/1985 | Friedman |
| 4,557,399 A | | 12/1985 | Redick, Jr. |
| 4,723,688 A | | 2/1988 | Munoz |
| 4,828,146 A | | 5/1989 | Stein |
| 4,838,767 A | | 6/1989 | Ohe et al. |
| 4,850,120 A | | 7/1989 | Stein |
| 4,902,202 A | | 2/1990 | Bowden |
| 4,919,308 A | | 4/1990 | Majkrzak |
| 5,026,969 A | | 6/1991 | Knepler et al. |
| 5,035,173 A | | 7/1991 | Stein et al. |
| 5,065,927 A | | 11/1991 | Wahl et al. |
| 5,114,045 A | | 5/1992 | Herpe et al. |
| 5,121,857 A | | 6/1992 | Hutchinson |
| 5,123,178 A | | 6/1992 | Stein |
| 5,180,291 A | | 1/1993 | Kent |
| 5,301,601 A | | 4/1994 | Cretors |
| 5,397,219 A | | 3/1995 | Cretors |
| 5,505,009 A | | 4/1996 | Stein et al. |
| 5,555,792 A | | 9/1996 | Stein et al. |
| 5,590,582 A | | 1/1997 | Weiss |
| 5,657,684 A | * | 8/1997 | Chaikowsky ................ 99/323.7 |
| 5,699,720 A | | 12/1997 | Stein et al. |
| 5,771,779 A | | 6/1998 | Stein et al. |
| 6,098,526 A | | 8/2000 | Stein et al. |
| 6,123,011 A | * | 9/2000 | Cretors ....................... 99/323.9 |
| 6,187,353 B1 | | 2/2001 | Wyman et al. |
| 6,374,727 B1 | | 4/2002 | Cretors |
| 7,082,891 B2 | | 8/2006 | Watson |
| 2003/0113420 A1 | | 6/2003 | Martin et al. |

OTHER PUBLICATIONS

"Suspended Poppers: 20 oz., 32 oz., 48 oz., 60 oz." C. Cretors and Company, 6 pages, published Nov. 2004.

"Topping Systems," C. Cretors and Company, 2 pages, published Nov. 2003.

Gold Medal Products Co.; "Funfood Equipment & Supplies" catalog; vol. 56, dated 2000, 108 pages.

Proctor Companies; Equipment Catalog, 1992,33 pages.

Proctor Companies; "Concession Stands and Equipment" catalog, vol. 3, 1996, 84 pages.

\* cited by examiner

# POPCORN MACHINES WITH TOPPING DISPENSING SYSTEMS AND ASSOCIATED METHODS OF USE AND MANUFACTURE

CROSS REFERENCE TO RELATED APPLICATION INCORPORATED BY REFERENCE

The present application claims priority to U.S. Provisional Application Ser. No. 60/955,829, entitled "POPCORN MACHINES WITH BUILT-IN TOPPING DISPENSING SYSTEMS," filed Aug. 14, 2007, and incorporated herein in its entirety by reference.

TECHNICAL FIELD

The following disclosure relates generally to popcorn machines and, more particularly, to popcorn machines having systems for applying topping to popcorn.

BACKGROUND

Various types of popcorn machines are used in theaters and other commercial settings. These machines typically include a popping kettle positioned within a glass case or cabinet in which popcorn is both produced and stored. In operation, unpopped corn (kernels) are placed into the kettle with a suitable oil and heated. The kettle is typically a metal container with an open top that allows heat distribution to the kernels and the oil. As the popcorn pops, it fills up the kettle and begins to spill out onto the base of the cabinet. When popping is complete, the kettle can be manually rotated to dump the remaining popcorn into the cabinet.

When a customer orders popcorn, the salesperson reaches into the cabinet and scoops the desired quantity of popcorn into a bag, bucket, or other suitable serving container. Often, customers like to add salt, butter (or butter-flavored topping), and/or other toppings to their popcorn. In some settings, the salesperson will apply the desired topping to the popcorn using a topping dispenser positioned behind the sales counter. In other settings, the salesperson will direct the customer to a nearby self-service counter that carries a topping dispenser as well as other condiments.

One downside of conventional popcorn concessions in theaters and other commercial settings is that they tend to consume a relatively large amount of space. For example, a typical popcorn concession requires space for a popcorn machine or a popcorn warmer cabinet, and space for an associated topping dispenser that is usually placed near the popcorn machine. Not only does this arrangement consume valuable counter space, but it is also time consuming for the salesperson (or customer) to go through the additional step of taking the popcorn over to a topping dispenser for topping. In addition, some customers ask to have the serving container partially filled with popcorn, have some topping added, have the rest of the container filled with popcorn, and then more topping added. This requires several trips back and forth from the popcorn cabinet to the topping dispenser. In view of these disadvantages, it would be desirable to position a topping dispenser inside a popcorn machine cabinet to conserve counter space.

DETAILED DESCRIPTION

The following disclosure describes various embodiments of popcorn machines having topping dispensing systems. In one embodiment, for example, a popcorn machine carries a heated topping container below a see-through cabinet in which popcorn is held. Heated topping from the container is supplied to an outlet positioned above the popcorn via a delivery tube which runs along a corner portion of the cabinet. In this embodiment, a fluid pump, e.g., an oscillating pump is used to move the heated topping from the container to the outlet. The pump can be activated by pressing a popcorn serving container against a push bar or other actuator positioned directly below the outlet. When activated, the pump can dispense topping (e.g., butter, butter-flavored topping, etc.) onto the popcorn in the serving container. In one embodiment, the pump can dispense topping for a preset period of time which is controlled by a timer operably connected to the actuator. In other embodiments, the pump can be configured to dispense topping from the outlet for as long as the push bar is depressed.

Certain details are set forth in the following description and in FIGS. 1-11 to provide a thorough understanding of various embodiments of the invention. Other details describing well-known structures and systems often associated with popcorn machines, popcorn popping systems, popcorn topping application systems, and other popcorn-related structures and systems have not been set forth in the following disclosure to avoid unnecessarily obscuring the description of the various embodiments of the invention.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
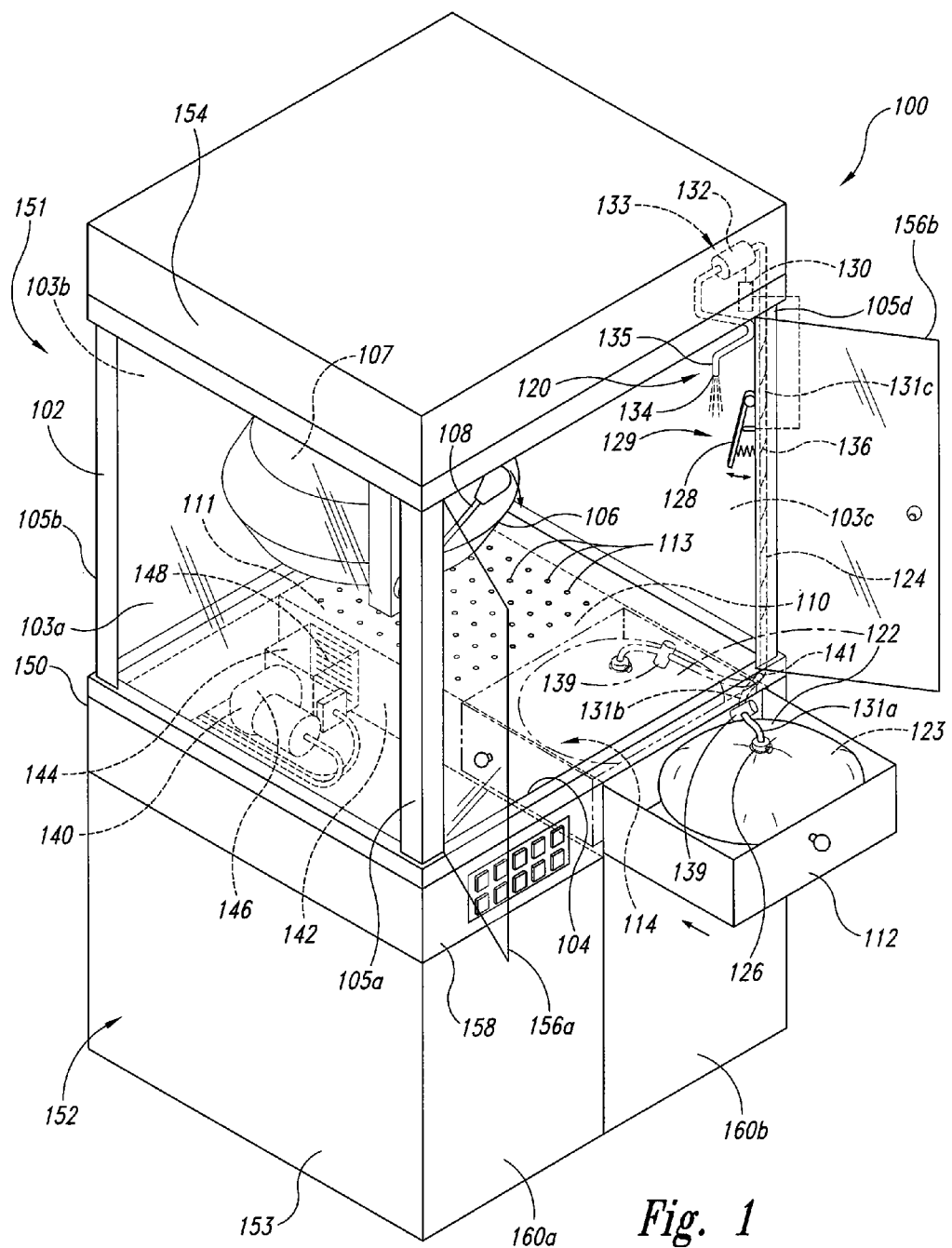
FIG. 1 is an isometric view of a popcorn machine having a topping dispensing system configured in accordance with an embodiment of the invention.

FIG. 1 is an isometric view of a popcorn machine 100 having a topping dispensing system 120 configured in accordance with an embodiment of the invention. In the illustrated embodiment, the popcorn machine 100 includes a rectilinear housing 150 having an upper portion 151 and a lower portion 152. The lower portion 152 can include a base 153 with a front cover 158 and one or more doors 160a, b to provide access to an interior region of the lower portion 152. The upper portion 151 can include a display case or cabinet 102 having a plurality of see-through wall portions or panels 103 (identified individually as panels 103a-c) extending at least partially between an interior base surface 110 and a top 154. The see-through panels 103 can be made of tempered glass, plexiglass, or other transparent material to allow viewing of the popping process and the popcorn stored in the cabinet 102. In the illustrated embodiment, the cabinet 102 includes a plurality of corner members 105 (identified individually as corner members 105a-d) extending vertically between adjacent see-through panels 103. The cabinet 102 can further include an opening 104 to provide an operator (not shown) with access to an interior portion of the cabinet 102. In various embodiments, the cabinet 102 can optionally include one or more doors 156a, b hingeably attached to adjacent corner members 105 to close, or at least partially close the opening 104. All or a portion of the doors 156 can be constructed from transparent materials like those of the see-through panels 103.

In another aspect of this embodiment, the popcorn machine 100 further includes a popping kettle 106 positioned in an upper portion of the cabinet 102. The popping kettle 106 can be suspended from the top 154 of the cabinet 102, and can include a metal (e.g., a stainless steel) container that allows heat distribution to the un-popped corn kernels and cooking oil placed therein. The popping kettle 106 can include a heating element (e.g., an electrical heating element, gas heating element, etc.) for increasing the kettle temperature and popping the corn. The popping kettle 106 can include a lid 107 that prevents popcorn and/or oil from escaping until the popping operation is nearly completed. The lid 107 can include a hinged portion that opens as the volume of popped corn increases within the kettle 106. A handle or lever 108 is operably coupled to the popping kettle 106, and can be rotated downwardly to tip the popping kettle 106 over and dump the finished popcorn (not shown) on to the base surface 110 of the cabinet 102.

In some embodiments, the popping kettle 106 and the cabinet 102 and can be at least generally similar in structure and function to various models of popping kettles and cabinets manufactured and sold by C. Cretors & Company, of 3243 N. California Ave., Chicago, Ill. 60618. In other embodiments, the popcorn machine 100 can utilize other types of popping kettles, popping apparatuses, and/or cabinets known in the art. Other types of popping apparatuses can include, for example, hot-air poppers, microwave poppers, etc. Furthermore, in other embodiments the popping kettle 106 can be located in other positions relative to the cabinet. For example, in some embodiments the cabinet can be an open top cabinet, and the popping kettle can be positioned above, or at least partially above the open top. In still further embodiments, the topping dispensing systems and related structures and systems disclosed herein can be used with popcorn warmers that do not have popping kettles. Such warmers can include display cabinets the hold warmed popcorn produced from popping kettles remote from the cabinet. Accordingly, the present disclosure is not limited to the particular embodiments of the popping kettle 106, the cabinet 102, and the other features illustrated in FIG. 1.

In a further aspect of this embodiment, the popcorn machine 100 can also include a heating system 140 and an adjacent storage area 114 positioned beneath the base surface 110 of the cabinet 102. The storage area 114 can include a drawer, such as a cleanout drawer 112 which is configured to slide into and out of a heated plenum 111 positioned under the base surface 110. The heating system 140 can include an electric heating unit 144 in combination with a fan or other air mover 146 that directs heated air into the plenum 111 through vents 148 in a divider 142. The heated air warms the contents of the cleanout drawer 112. The heated air also flows upwardly through perforations 113 in the base surface 110 to warm popcorn in the cabinet 102.

In another aspect of this embodiment, a topping container 122 which holds popcorn topping 123 is removably positioned in the cleanout drawer 112. The popcorn topping 123 can include, for example, butter, butter-flavored topping (e.g., butter-flavored oil), vegetable oil, canola oil corn oil, soy bean oil, coconut oil, peanut oil, sunflower oil, and/or other types of shelf-stable oils and the like, as well as various mixtures thereof and other known popcorn topping substances. In some embodiments, other toppings can include chocolate-flavored toppings and other sweetened and/or fruit flavored syrups. In the illustrated embodiment, the topping container 122 includes a bag (e.g., a plastic bag) that holds the popcorn topping 123. In other embodiments, however, the other types of topping containers and holders can be used with the present disclosure. Such containers and holders can include, for example, metal containers (e.g., stainless steel bowls, tubs, etc.), plastic containers (e.g., plastic bins, jugs, etc.), heated storage areas, heated shelves, and the like. Although not shown in FIG. 1, the cleanout drawer 112 can also carry popping oil and/or other ingredients for use in the popping kettle 106, and/or other food service supplies, replacement parts, etc.

In another aspect of this embodiment, the topping dispensing system 120 further includes a fluid mover 133 positioned in an upper portion of the cabinet 102. In the illustrated embodiment, the fluid mover 133 includes an electric pump 132 (e.g., an oscillating pump) supported from the top 154 of the cabinet 102. In other embodiments, the topping dispensing system 120 can include other types of fluid movers such as other types of pumps (e.g., impellor pumps, gear pumps, diaphragm pumps, suction pumps, pressure pumps, manually operated pumps, etc.). In still further embodiments, topping dispensing systems configured in accordance with the present disclosure can operate without pumps, and can instead utilize head pressure and other gravity-based systems for topping delivery. As described in greater detail below, the pump 132 can be located in a number of different positions in and/or around the popcorn machine 100.

A delivery tube 124 forms a topping passage that operably extends from the topping container 122 to the pump 132. In the illustrated embodiment, the delivery tube 124 is formed from a first conduit portion 131a, a second conduit portion 131b, and a third conduit portion 131c. A fluid coupling 126 (e.g., a quick disconnect or bag connector) operably connects one end of the first conduit portion 131a to the topping container 122. Various types of bag connectors and/or other suitable fluid couplings are known in the art. In one embodiment, the fluid coupling 126 can be a bag connector (e.g., part no. 4673-S, 0505009-01) from First American Plastic Molding Enterprise of 810 Progressive Lane, South Beloit, Ill. 61080. In other embodiments, other types of fluid couplings and bag connectors can be used to connect the first conduit portion 131a in fluid communication with the topping container 122.

The other end of the first conduit portion 131a is operably connected to the inlet of a filter 139 with a hose-clamp or other suitable clamping device (not shown). The outlet of the filter 139 is operably connected to one end of the second conduit portion 131b, while the other end of the second conduit portion 131b is operably connected to the lower end of the third conduit portion 131c with a hose clamp or other suitable device at a junction 141. The filter 139 can prevent debris and/or other undesirable substances from reaching the pump 132 and possibly clogging the pump or causing some other malfunction. In one embodiment, the filter 139 can be an in-line cleanable filter, such as part no. 14626, 5RV07 provided by W.W. Grainger Inc. of Lake Forest, Ill. In other embodiments, other types of filters can be used or the filter 139 can be omitted.

After the topping container 122 is placed in the cleanout drawer 112 and connected to the first conduit portion 131a, the cleanout drawer 112 can be slid into the cabinet 102 underneath the perforated base surface 110, as shown by the phantom lines in FIG. 1. In the illustrated embodiment, the first and second conduit portions 131a, b can be made from flexible tubing materials (e.g., silicone, polyethylene, polyurethane, etc.) that bend easily when the cleanout drawer 112 is slid into and out of the cabinet 102 with the topping container 122 in position. The first and second conduit portions 131a, b can have inside diameters of from about 0.12 inch to about 0.37 inch, e.g., about 0.25 inch. In other embodiments, the first and second conduit portions 131a, b can have other dimensions.

The third conduit portion 131c extends upwardly from the cleanout drawer 112 along a corner portion of the cabinet 102, and is operably connected to the pump 132. P-clamps and/or other suitable support fittings (not shown) can be used to suitably attach the third conduit portion 131c to the adjacent structure. The pump 132 draws the topping 123 from the container 122 through the delivery tube 124 in response to actuation of a pump activation system 129. The pump 132 dispenses the topping 123 from an outlet 134 spaced apart from the popping kettle 106 via a dispensing tube 135. In the illustrated embodiment, the third conduit portion 131c and the dispensing tube 135 can be formed from metal, such as standard stainless steel tubing, having inside diameters of from about 0.12 inch to about 0.37 inch, e.g., about 0.25 inch. In other embodiments, these parts can be formed from other suitable materials, such plastic tubing, silicone tubing, etc. and have other dimensions. As described in greater detail below, in the illustrated embodiment the pump activation system 129 includes a depressible push bar or bumper bar 128 positioned beneath the outlet 134. In other embodiments, however, the pump 132 can be activated by other means (e.g., a foot pedal; a pull cord or lever; a push button or touch screen on the interior or exterior of the housing 150; a bumper bar or other structure that is mounted to the housing and actuated by the operator's knee, hip or hand; motion sensors; proximity sensors; etc.)

In one aspect of the illustrated embodiment, the bumper bar 128 can be operably connected to a timer 130 (shown schematically in FIG. 1) which can be configured to limit pump operation to a preset period of time (e.g., from about 3 seconds to about 6 seconds, such as about 4-5 seconds) each time the pump 132 is activated. In other embodiments, however, the timer 130 can be omitted and the pump 132 can be configured to dispense topping from the outlet 134 for as long as the bumper bar 128 is depressed or the pump 132 is otherwise actuated.

The topping dispensing system 120 can additionally include a heating element (or elements) 136 operably coupled to all or a portion of the delivery tube 124. In the illustrated embodiment, for example, the heating element 136 can include an adhesive-backed foil, electrical heating element attached to the third conduit portion 131c to warm the topping 123 as it moves from the topping container 122 toward the pump 132. Warming the topping 123 may help to keep it flowable and reduce clogs in the delivery tube 124. The heating element 136 can include resistive heating elements rated at about 120V and 8 W maximum output, with about 0.95 watts-per-square inch watt density. In other embodiments, however, other means of warming the topping 123 as it moves through the delivery tube 124 can be provided. Such means can include, for example, hot air warming, radiant warming, ambient warming, insulation, etc. In yet other embodiments, the heating element 136 can be omitted, or other types of heated and unheated passages can be used to transfer the topping 123 from the container 122 to the pump 132.

In operation, un-popped corn (e.g., kernels) is placed into the popping kettle 106 along with a suitable oil and is popped. After popping, the operator dumps the popcorn onto the perforated base surface 110 of the cabinet 102 by manually rotating the lever 108 downwardly. When a customer orders some of the popcorn, the operator reaches into the cabinet 102 and scoops the desired amount of popcorn into a suitable serving container (not shown). If the customer requests topping (e.g., butter-flavored topping), the operator can depress the bumper bar 128 with the serving container to activate the pump 132. In one embodiment, the pump 132 dispenses topping onto the popcorn in the serving container for a preset period of time as controlled by the timer 130. At the end of this time interval, the pump 132 stops and the popcorn is served to the customer. In other embodiments in which the timer 130 is omitted, the pump 132 can dispense topping for as long as the operator depresses the bumper bar 128, or for some other period of time.

Figure 2:
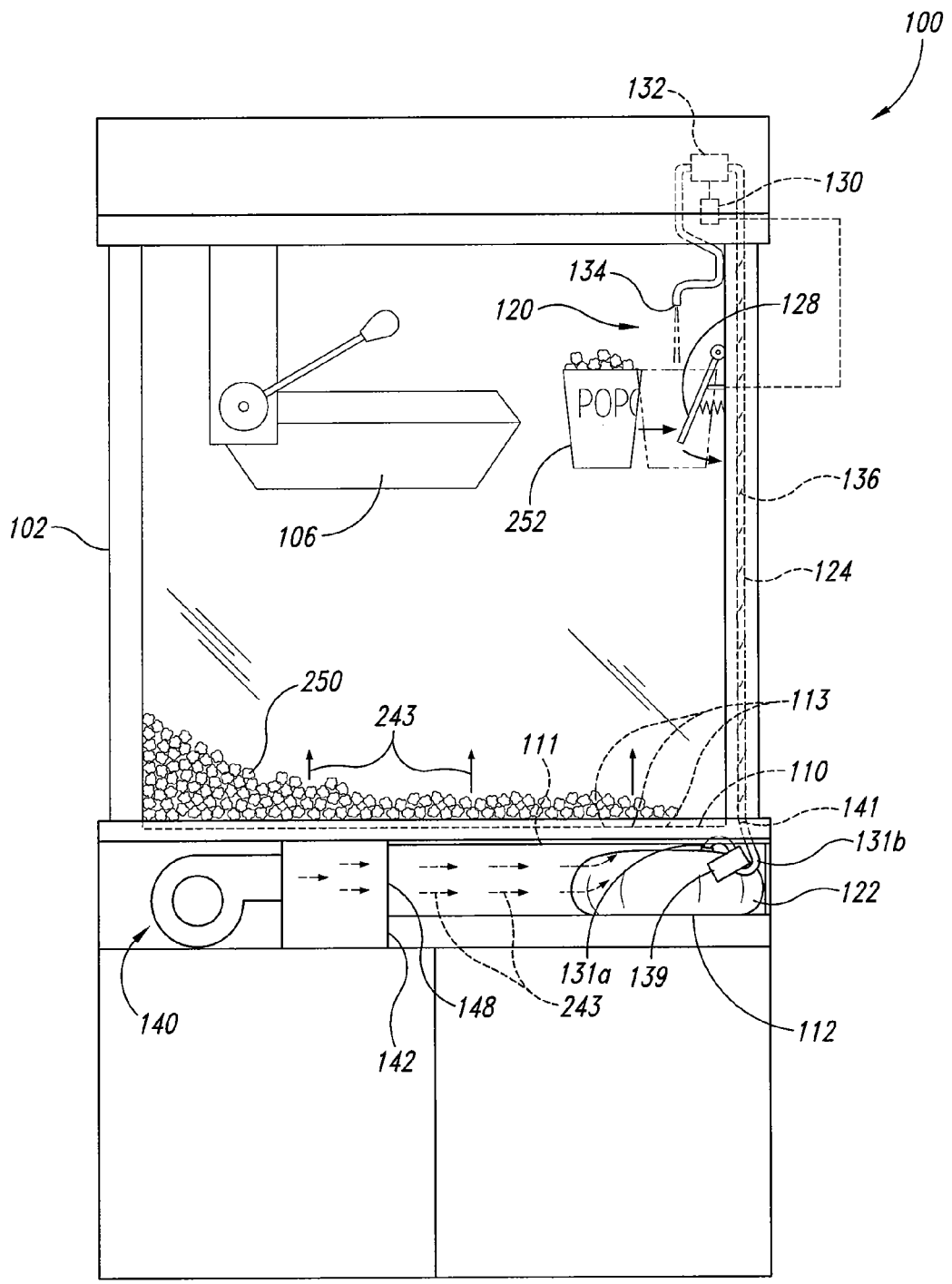
FIG. 2 is front elevation view of the popcorn machine of FIG. 1.

FIG. 2 is an elevation view of the popcorn machine 100 with a portion of the front cover 158 removed to show various aspects of the topping dispensing system 120 in more detail. As this view illustrates, the heating system 140 directs heated air through the vents 148 in the divider 142 beneath the perforated base surface 110. The heated air (illustrated by the arrows 243) flows into the plenum 111 and the cleanout drawer 112 and heats the topping container 122. The heated air also flows upwardly through the perforations 113 in the base surface 110 to heat popcorn 250 in the cabinet 102. In one embodiment, the air flowing from the heating system 140 can be at a temperature ranging from about 120° F. to about 170° F., e.g., about 150° F. As described in greater detail below, in other embodiments the topping container 122, or other form of topping container (e.g., a stainless steel bowl or other vessel), can be positioned at other locations in the popcorn machine 100, can be heated by other sources, and/or can be supported by other topping holders (e.g., shelves positioned above or below the cabinet 102). For example, in another embodiment a topping container can be supported by a holder or shelf in the lower portion 152 of the popcorn machine 100, and heated by a local heating element, such as an electrical heating element.

Figure 3:
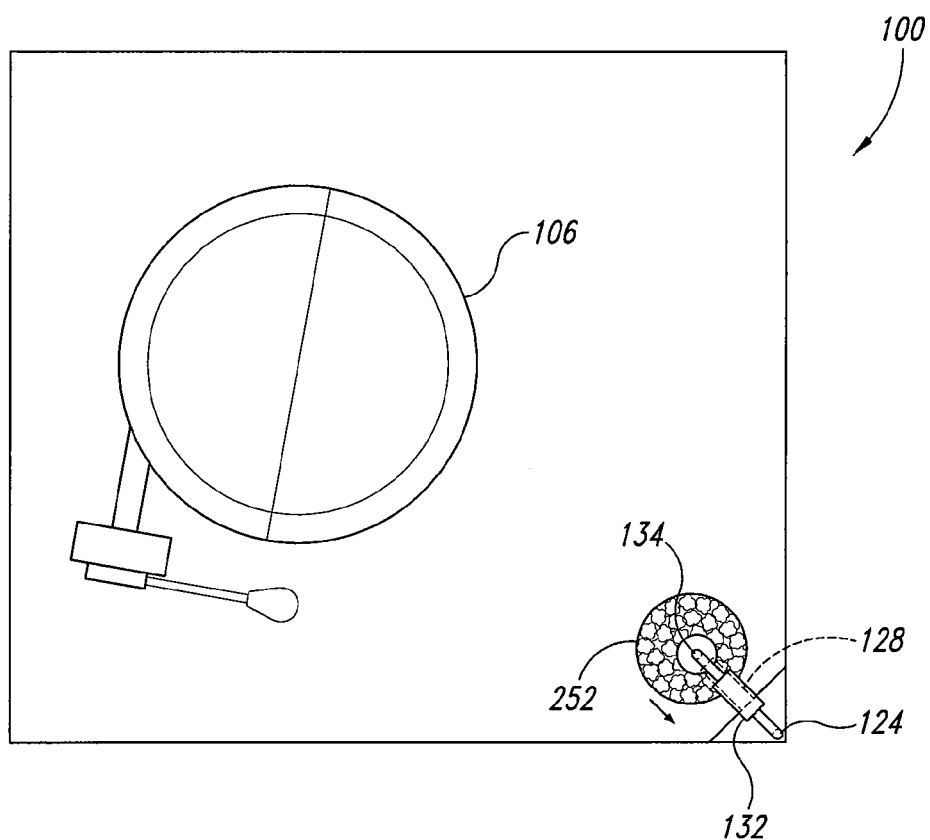
FIG. 3 is a top view of the popcorn machine of FIG. 1.

FIG. 3 is a top view of the popcorn machine 100 illustrating the relationship between the popping kettle 106 and the bumper bar 128. Referring to FIGS. 2 and 3 together, a salesperson or other machine operator (not shown) can fill a serving container 252 with freshly popped popcorn, and then depress the bumper bar 128 with the serving container 252 to activate the pump 132. As described in greater detail below, the bumper bar 128 is operably coupled to a switch which activates the pump 132 for a preset period of time controlled by the timer 130 (FIG. 1). Once activated, the pump 132 dispenses topping onto the popcorn in the container 252 through the outlet 134. The time period during which topping is dispensed can be adjusted depending on a number of different factors including personal preference, type of topping, size of popcorn serving, etc.

Figure 4:
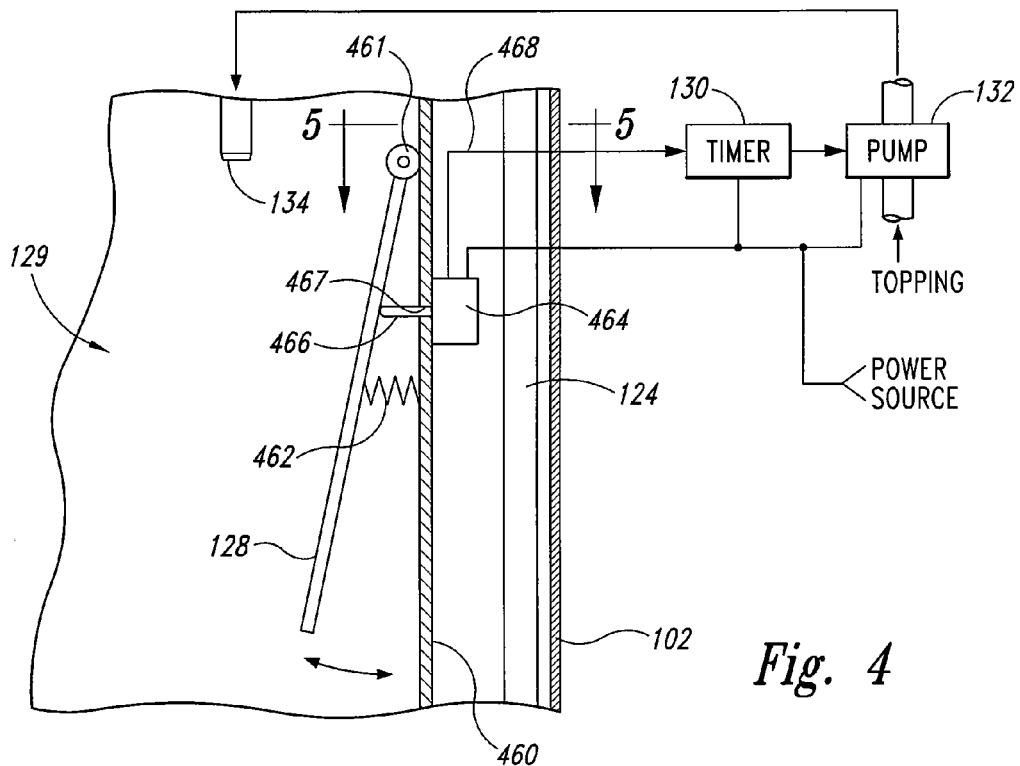
FIG. 4 is an enlarged side view of a portion of the popcorn machine of FIG. 1, illustrating various aspects of the topping dispensing system in accordance with an embodiment of the invention.
Figure 5:
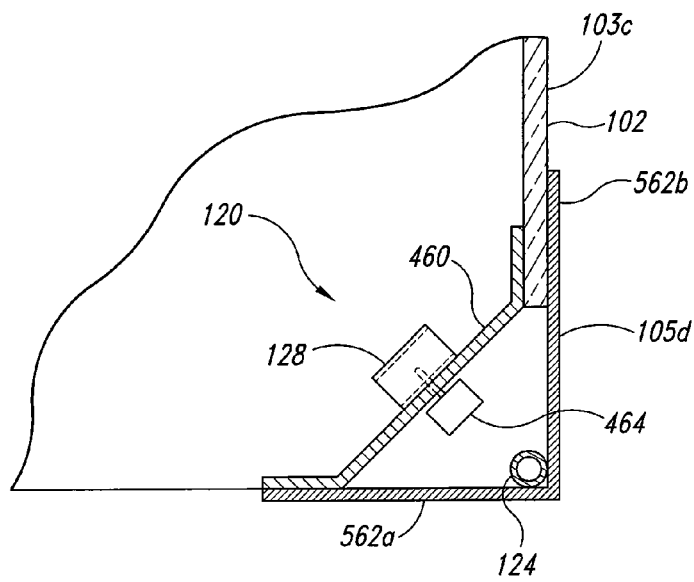
FIG. 5 is an enlarged top view of a portion of the popcorn machine of FIG. 1, illustrating additional aspects of the topping dispensing system in accordance with an embodiment of the invention.

FIG. 4 is an enlarged side view of a portion of the popcorn machine 100 illustrating various features associated with the pump activation system 129 in more detail. FIG. 5 is a top view of the corner of the cabinet 102 taken along line 5-5 in FIG. 4. Referring to FIGS. 4 and 5 together, in one aspect of this embodiment the bumper bar 128 is pivotably attached to a cover member 460 by a hinge 461. The cover member 460 extends at least generally between a first side portion 562a and a second side portion 562b of the corner member 105d. A switch 464 having a depressible actuator or button 466 protruding therefrom is operably mounted to a backside of the cover member 460. A distal portion of the button 466 extends through an aperture 467 in the cover member 460 and contacts, or is at least proximate to, the bumper bar 128. When the bumper bar 128 is depressed toward the cover member 460, the bumper bar 128 depresses the button 466. In the illustrated embodiment, the switch 464 responds by sending a signal (e.g., an electrical signal) to the timer 130 (shown schematically in FIG. 4) via wiring 468. The timer 130 sends a corresponding signal to the pump 132 to activate the pump 132 and dispense topping through the outlet 134 for a preset period of time (e.g., from about 2 seconds to about 6 seconds, e.g., about 4 to 5 seconds). In some embodiments, the switch 464 can be a 120V, 5 A momentary type switch known in the art and having suitable mounting provisions for securing to the cover member 460. In other embodiments, the switch 464 can be configured to transmit wireless signals (e.g., RF signals) to the timer 130 and/or the pump 132. In still further embodiments, other types of switches can be used to activate the timer 130 and/or the pump 132. Moreover, as described in detail above, in other embodiments the timer 130 can be omitted and the switch 464 can send an electrical signal or other type of activation signal directly to the pump 132. In such embodiments, the pump 132 can be configured to dispense topping from the outlet 134 for as long as the bumper bar 128 is depressed or the pump 132 is otherwise activated.

As shown in FIG. 4, a coil spring 462 or other type of biasing member can be operably coupled to the bumper bar 128 and/or the cover member 460 so that the bumper bar 128 returns to its start position after the serving container 252 (FIGS. 2 and 3) has been removed. Although in the embodiment described above the bumper bar 128 is mounted to the cover member 460 below the topping outlet 134, in other embodiments the bumper bar 128 or other type of actuation arm or member can project downwardly from the top 154 of the popcorn machine 100.

As FIG. 5 illustrates, the topping delivery tube 124 and the switch 464 can be hidden from view behind the corner cover member 460. In the illustrated embodiment, the bumper bar 128 can be a generally flat, stainless steel member. In other embodiments, however, the bumper bar 128 can be shaped or contoured (e.g., concave) to receive a popcorn serving container and facilitate operation thereby. Moreover, as described in greater detail below, in still further embodiments the pump 132 can be activated by various other types of pump actuation systems without departing from the spirit or scope of the present disclosure. Such actuation systems can include, for example, user-actuated features such as a simple push button positioned on the inside or outside of the cabinet 102. In other embodiments, the topping dispensing system 120 can be activated by a remote foot pedal or other manually operated switch positioned on or near the exterior of the popcorn machine 100. For example, in one embodiment, the topping dispensing system 120 can be activated by a foot pedal positioned near the lower portion of the popcorn machine 100. Accordingly, those of ordinary skill in the art will appreciate that the present invention is not limited to the particular embodiments and/or features illustrated in the accompanying Figures, but extends to other embodiments and equivalents thereof falling within the scope of the present disclosure and/or the following claims.

Embodiments of the popcorn machine 100 described above offer a number of advantages over conventional popcorn concessions having topping dispensers that are separate from the popcorn machine. For example, not only does the layout of the popcorn machine 100 save time, but it also takes up less space than conventional popcorn concessions. Accordingly, the popcorn machine 100 can advantageously reduce congestion at food concessions in theaters and other commercial settings. Another advantage of some embodiments of the topping dispensing system 120 described above is that it can be incorporated into or retrofitted to existing popcorn machines.

Figure 6A:
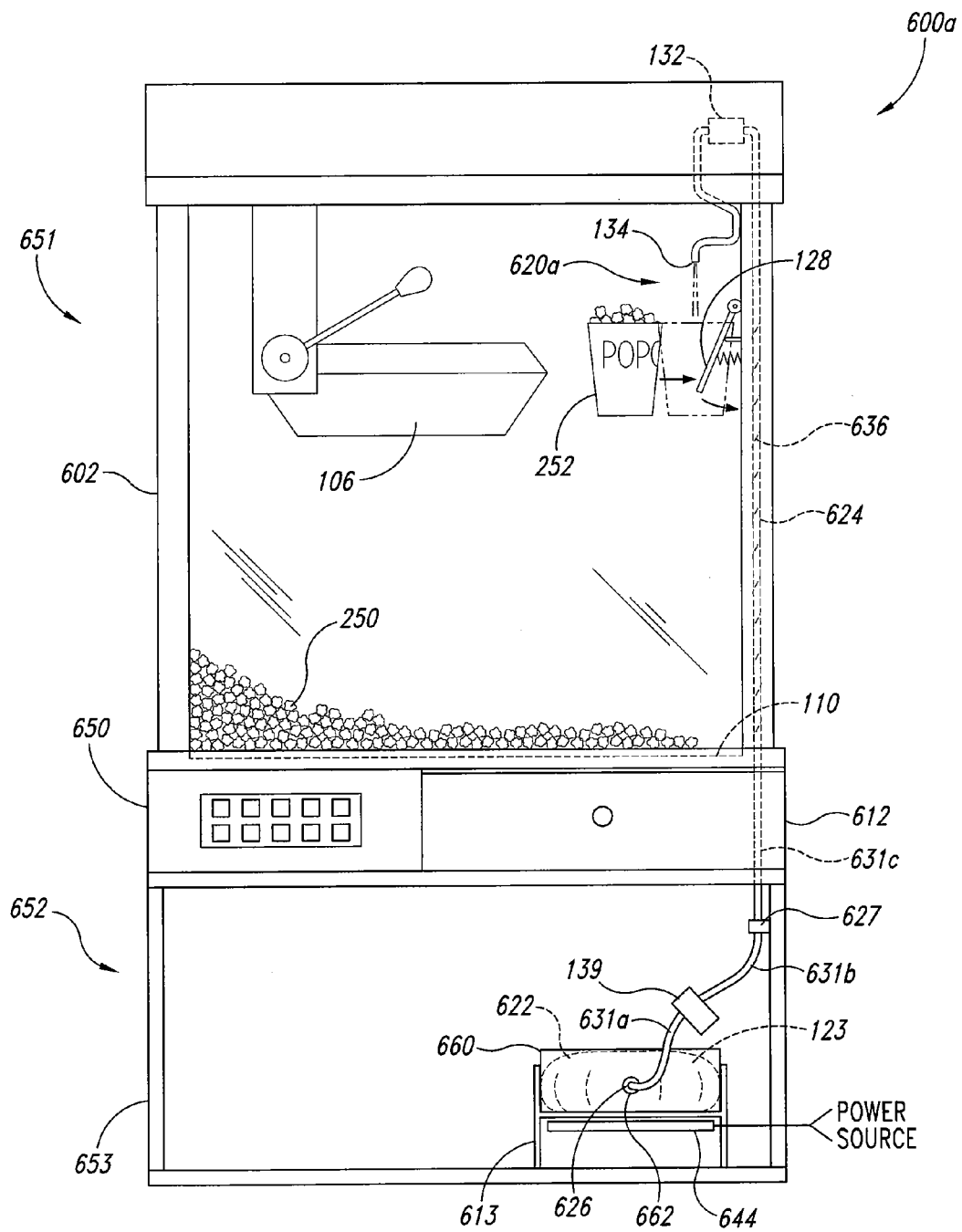
FIGS. 6A and 6B are front elevation views of popcorn machines having topping dispensing systems configured in accordance with other embodiments of the invention.
Figure 6B:
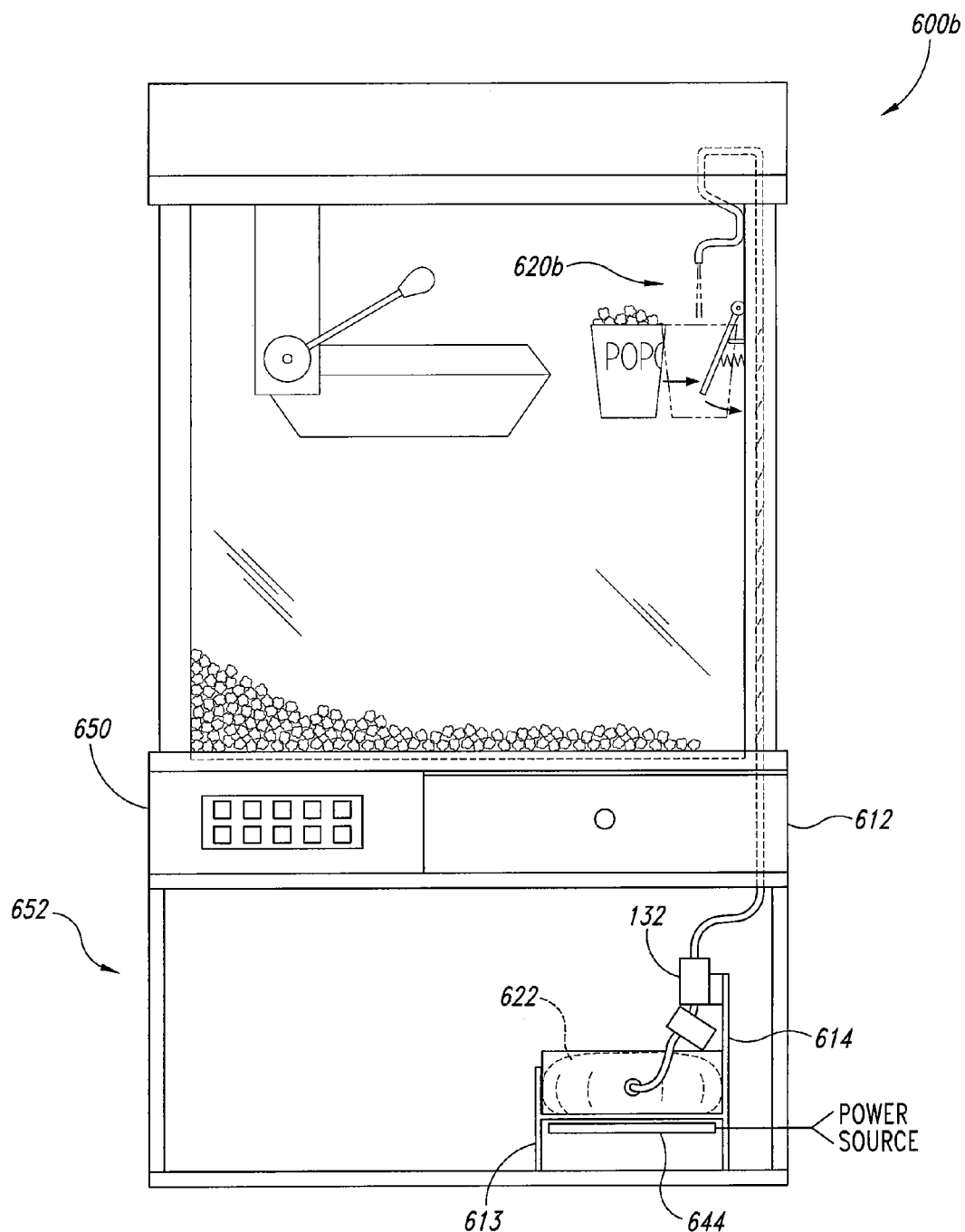

FIGS. 6A and 6B are front elevation views of popcorn machines 600a and 600b, respectively, having topping dispensing systems 620a and 620b configured in accordance with other embodiments of the invention. Many features of the popcorn machines 600a, b are at least generally similar in structure and function to corresponding features of the popcorn machine 100 described above with reference to FIGS. 1-5. For example, referring first to FIG. 6A, the popcorn machine 600a includes a housing 650 having an upper portion 651 and a lower portion 652. The upper portion 651 includes a cabinet 602 that is at least generally similar in structure and function to the cabinet 102 of the popcorn machine 100 described above. The lower portion 652 includes a base 653. The doors or other front panels normally covering the base 653 have been removed in FIG. 6A for purposes of illustrating the location of a topping container 622.

In the popcorn machine 600a, the topping container 622 is positioned on a shelf 613 in the lower portion 652 of the housing 650 beneath a cleanout drawer 612. The topping container 622 can be at least generally similar in structure and function to the topping container 122 described above. In the illustrated embodiment, however, the topping container 622 includes a bag (e.g., a plastic bag) that is positioned inside a portable support structure 660 (e.g., a cardboard box). Such "Bag-in-Box" toppings are commercially available from a number of sources including, for example, Odell's of 8543 White Fir St #D-1, Reno, Nev. 89523; and Ventura Foods, LLC, 40 Pointe Dr., Brea, Calif. 92821, under the LouAna brand. In other embodiments, however, the other types of topping containers can be used with the present disclosure. Such containers can include, for example, plastic bags without a surrounding box or other shipping structure, suitable metal containers, etc. In other embodiments, the topping container 622 and/or associated systems thereof (e.g., a fluid coupling) can be at least generally similar in structure and function to the popping oil storage apparatuses disclosed in U.S. Pat. No. 5,301,601, the disclosure of which is incorporated herein in its entirety by reference.

The shelf 613 can carry an oil warmer 644 (e.g., a thermostatically-controlled, electric heating element oil warmer) for keeping the topping 123 warm. In one embodiment, the oil warmer 644 can be a model 7907 oil warmer, rated at 120V, 1.7 A and available from C. Cretors & Company, of 3243 N. California Ave., Chicago, Ill. 60618. In other embodiments, other types of oil warmers suitable for use with commercial "bag-in-box" type oil containers and/or other topping containers can be used. The oil warmer 644 can receive electrical power via a power cord (not shown) connected to a receptacle (also not shown), such as a NEMA 5-15R type receptacle located in the lower portion 652 of the popcorn machine 600a. In other embodiments, the shelf 613 can include other types of oil warmers (e.g., hot-air warmers, heat lamps, etc.). Alternatively, the oil warmer 644 may be omitted if, for example, it is not needed in a particular setting or for a particular type of topping.

The support structure 660 includes an opening 662 so that one end of a first conduit portion 631a can be attached to a fluid coupling 626 on the topping container 622. The fluid coupling 626 can be at least generally similar in structure and function to the fluid coupling 126 described above with reference to FIG. 1. The opposite end of the first conduit portion 631a is connected to the inlet of the filter 139. A second conduit portion 631b extends from the outlet of the filter 139 to a third conduit portion 631c. Additionally, a P-clamp or other suitable support fitting 627 can be used to attach the third conduit portion 631c to the popcorn machine structure. In the illustrated embodiment, the first and second conduit portions 631a, b can be flexible tubes (e.g., silicone tubes), and the third conduit portion 631c can be a more rigid tube (e.g., a stainless steel tube) that extends from the second conduit portion 631b to the pump 132 along a corner portion of the cabinet 602. The conduit portions 631 form a delivery tube 624 (or topping passage) that provides the topping 123 to the pump 132 when the pump 132 is activated by means of the bumper bar 128 or other pump actuation system. As described above with reference to FIG. 1, a heating element 636 can be operably coupled to all or a portion of the delivery tube 624 to keep the topping 123 from thickening en route to the pump 132 from the container 622.

Referring next to FIG. 6B, the popcorn machine 600b is at least generally similar in structure and function to the popcorn machine 600a described above with reference to FIG. 6A. In the embodiment of FIG. 6B, however, the pump 132 is positioned in the lower portion 652 of the housing 650, instead of being carried near the top of the cabinet 602. More specifically, in this embodiment the pump 132 is mounted to a support 614 adjacent to the shelf 613.

The embodiments described above with reference to FIGS. 6A and 6B may be advantageous for use with popcorn machines that do not include a cleanout drawer or other storage region directly below the popcorn cabinet. In addition, positioning the topping container 622 and/or the pump 132 in the lower portion 652 of the housing 650 allows the space in the cleanout drawer 612 to be used for other things that may require more frequent access. Such an arrangement can also make it easier to clean out the cleanout drawer 612.

Figure 7A:
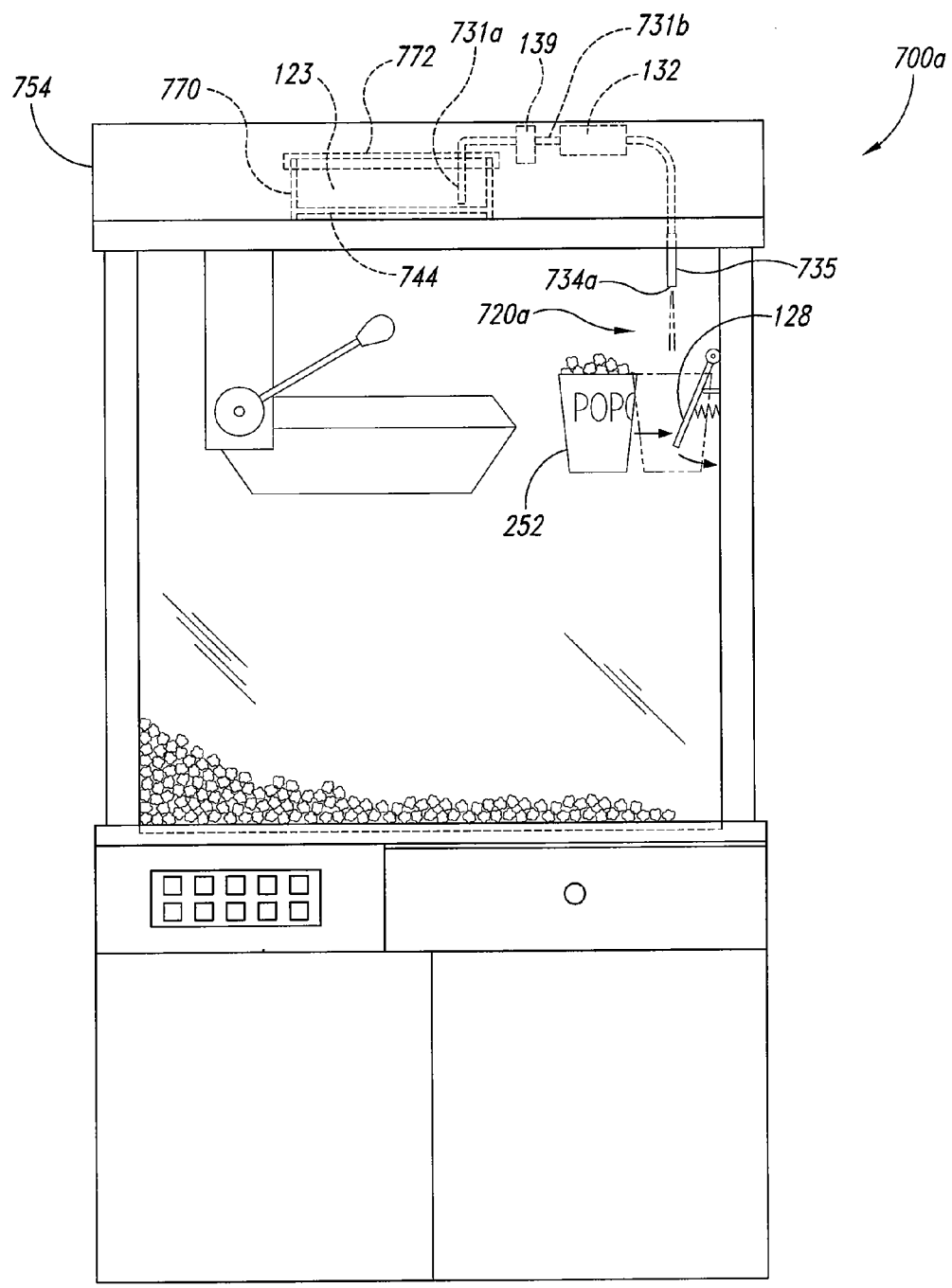
FIGS. 7A-7C are front elevation views of popcorn machines having topping dispensing systems configured in accordance with further embodiments of the invention.
Figure 7B:
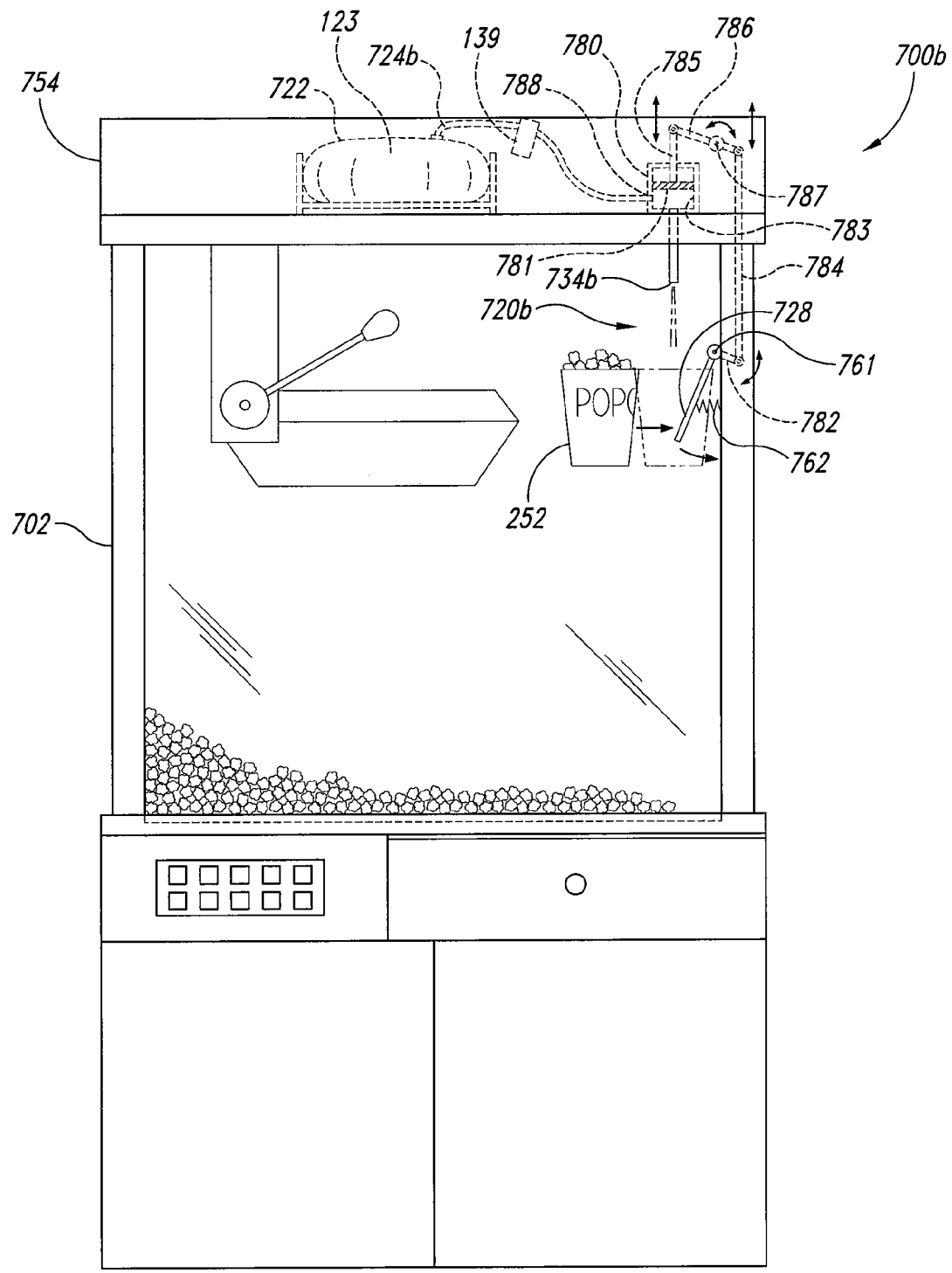

FIGS. 7A and 7B are front elevation views of popcorn machines 700a and 700b, respectively, having topping dispensing systems 720a and 720b configured in accordance with further embodiments of the invention. Many features of the popcorn machines 700a, b are at least generally similar in structure and function to corresponding features of the popcorn machines described in detail above. In the embodiments of FIGS. 7A and 7B, however, the popcorn topping is stored in a top 754 of a cabinet 702, instead of below the cabinet 702 as in the embodiments described above.

Referring first to FIG. 7A, in this embodiment the popcorn machine 700a includes a refillable container 770 having a removable lid 772. The topping container 770 and the lid 772 can be made from stainless steel. In other embodiments, the container 770 and/or the lid 772 can be made from plastic other suitable materials known in the art. Although the popcorn machine 700a could utilize any of the different topping containers described above (e.g., a bag, a bag-in-a-box, a bowl, etc.), in the illustrated embodiment the popcorn machine 700a utilizes a refillable container 770 to illustrate yet another type of topping container that can be used with the various topping dispensing systems described herein. A heat source 744 (e.g., a thermostatically controlled, electric heating element) can be positioned beneath the topping container 770 to maintain the topping 123 at an appropriate or suitable temperature. A first conduit portion 731a extends from a bottom portion of the topping container 770 to the inlet of the filter 139. A second conduit portion 731b extends from the outlet of the filter 139 to the inlet of the pump 132, and a dispensing tube 735 extends from the outlet of the pump 132 to a topping outlet 734. In one embodiment, the conduit portions 731 and the dispensing tube 735 can be stainless steel. In other embodiments, however, all or a portion of these tube segments can be made from silicone, plastic or other suitable material. In operation, an operator or other person can press the serving container 252 against the bumper bar 128 to activate the pump 132 and dispense the topping 123 from the topping outlet 734, as described in detail above with reference to FIGS. 1-5.

The topping dispensing system 720b illustrated in FIG. 7B includes a manually operated pump 780 configured in accordance with another embodiment of the invention. In the illustrated embodiment, a bumper bar 728 is configured to pivot about a hinge point 761 when depressed by the serving container 252 or other object. An arm 782 extends rearwardly from the bumper bar 728 and is pivotably coupled to a proximal end of a linkage 784. A distal end of the linkage 784 is pivotably coupled to a rocker arm 786 that can rock back and forth about a pivot 787. In one aspect of this embodiment, the pump 780 includes a piston 781 configured to move up and down in a cylinder or pump chamber 783. One end of a connecting rod 785 is operably coupled to the piston 781, and the other end of the connecting rod 785 is pivotably coupled to a distal end of the rocker arm 786. A topping container 722 (e.g., a bag, a bag-in-a-box, stainless steel container, etc.) filed with the topping 123 is operably coupled in fluid communication with the pump chamber 783 by means of a delivery tube 724b. The delivery tube 724b communicates with the pump chamber 783 via a one-way valve 788 that permits topping to flow into the pump chamber 783 but prevents topping from flowing out of the pump chamber 783.

In operation, an operator or other person can press the serving container 252 or other object (e.g., a hand) against the bumper bar 728 when he or she desires to apply topping to the popcorn in the serving container 252. Depressing the bumper bar 728 rotates the linkage 784 upwardly, causing the rocker arm 786 to rotate counter-clockwise driving the piston 781 downwardly in the pump chamber 783. This piston movement pressurizes the topping 123 in the piston chamber 783 and drives the topping 123 through an outlet 734b and onto the popcorn in the serving container 252. If the person desires more topping on their popcorn, he or she can repeat the foregoing action by moving the serving container 252 away from the bumper bar 728 and enabling a spring or other biasing member 762 to return the bumper bar 728 to its initial position. This causes the piston 781 to move upwardly in the pump chamber 783 and draw more of the topping 123 into the chamber. By repeating the motion of pushing the serving container 252 against the bumper bar 728, the person can dispense additional topping from the pump 780 onto his or her popcorn. This procedure can be repeated as many times as needed until the popcorn has the desired amount of topping.

Figure 7C:
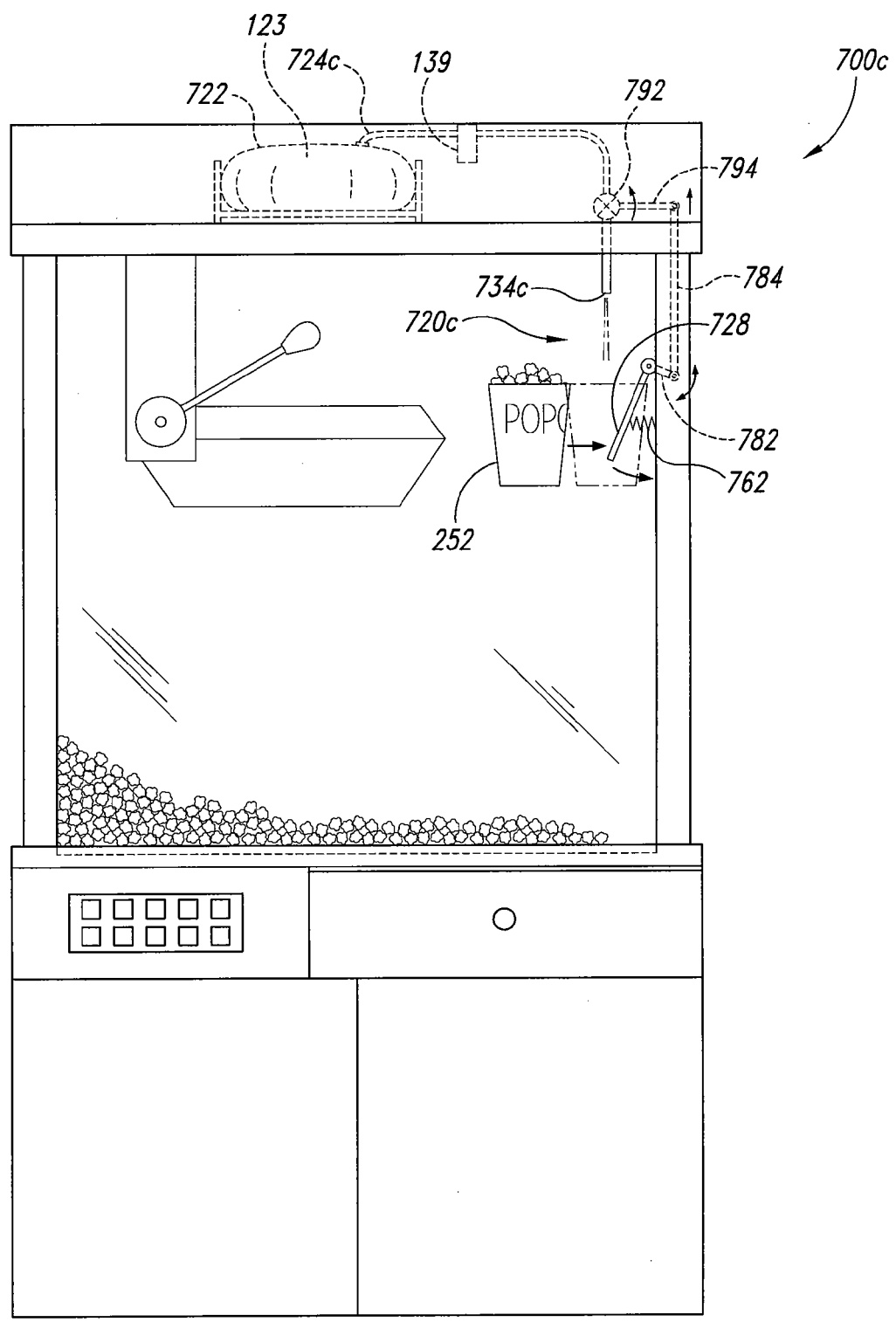

FIG. 7C is a front elevation view of a popcorn machine 700c having a topping dispensing system 720c configured in accordance with a further embodiment of the invention. Many features of the popcorn machine 700c can be at least generally similar in structure and function to the corresponding features of the various popcorn machines described in detail above. In this particular embodiment, however, a topping pump is not needed and the topping 123 is dispensed from the topping container 722 by means of a valve 792 (shown schematically). In the illustrated embodiment, the valve 792 is manually opened when the bump bar 728 is depressed by the serving container 252. More particularly, depressing the push bar 728 causes the linkage 784 to move upwardly. A distal end of the linkage 784 is pivotably attached to a lever 794. Upward movement of the lever 794 opens the valve 792, allowing the topping 123 to flow from the container 722 and through the outlet 734c. When the serving container 252 is removed, the linkage 784 moves downwardly and the valve 792 closes.

Although the valve 792 is manually opened and closed in the illustrated embodiment, and other embodiments the valve 792 can be electrically actuated (i.e., opened or closed) in response to an electrical signal sent from a switch or other apparatus operably coupled to the bump bar 728 as described in detail above. The valve 792 can be any number of different valves known in the art for suitably controlling the flow of the topping 723 from the container 722. Such valves can includes, for example, ball valves, butterfly valves, check valves, gate valves, needle valves, etc. In another embodiment, the topping container 722 can be a bag (e.g., a plastic bag), and the delivery tube 724c can be made of plastic or other resilient material. In this embodiment, the lever 794 can include a weighted arm that pinches the delivery tube 724c and closes the tube where it passes through the valve 792. When the weighted arm is raised (by, e.g., the linkage 784) the delivery tube 724 is opened and the topping is free to flow out the outlet 734c.

Figure 8A:
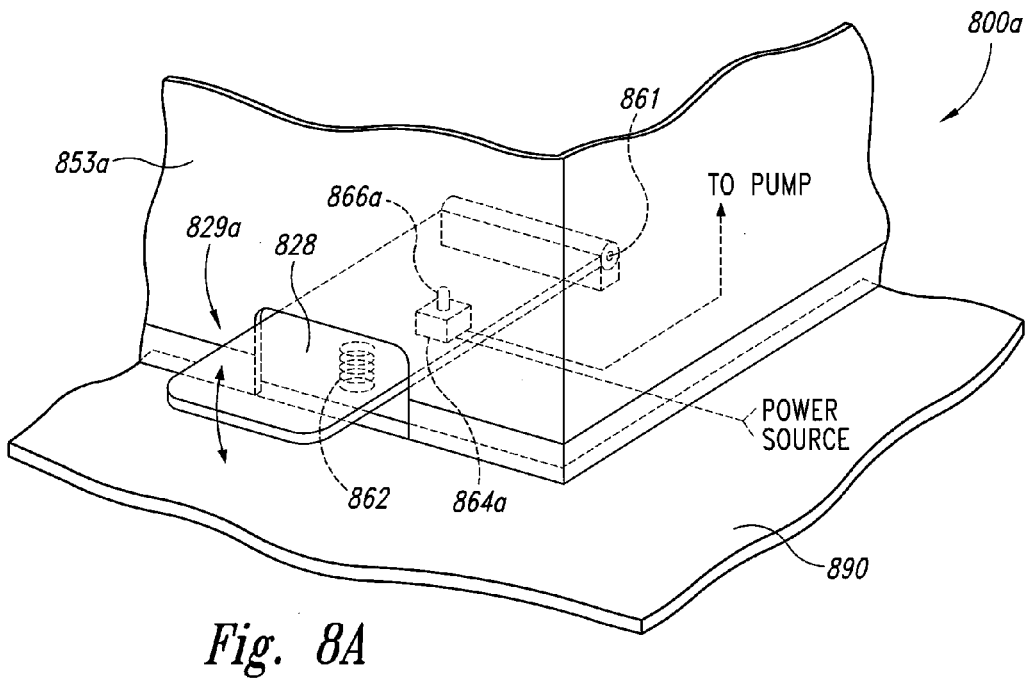
FIGS. 8A-8C are enlarged isometric views illustrating various topping pump actuation systems configured in accordance with embodiments of the invention.
Figure 8B:
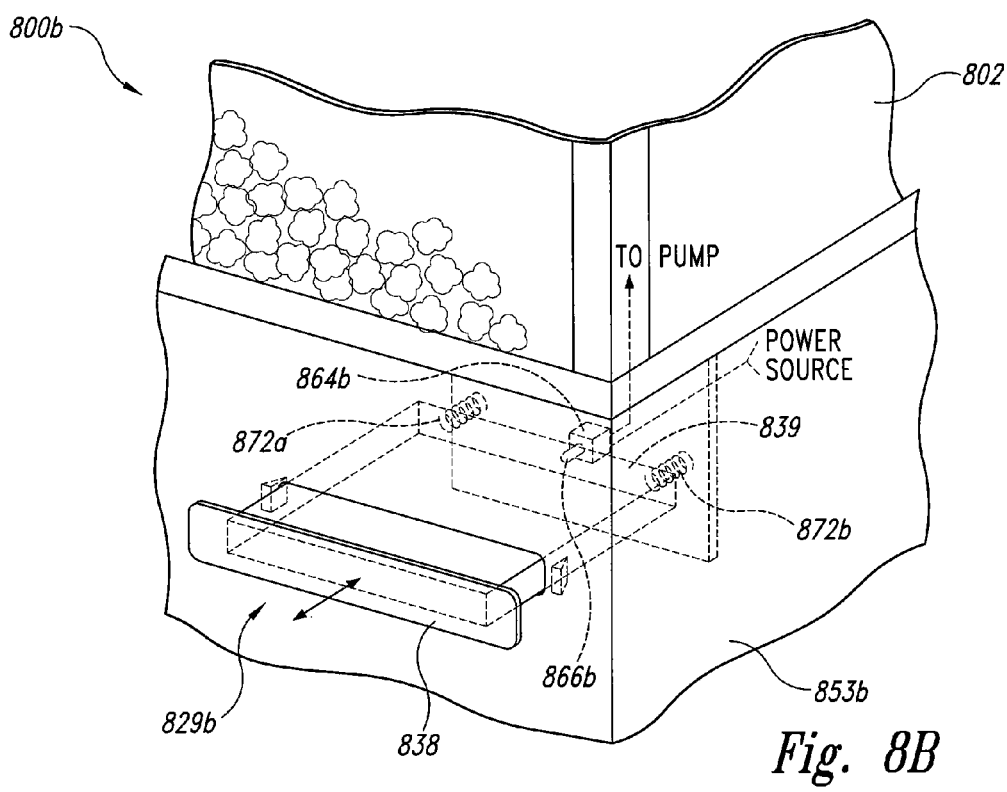
Figure 8C:
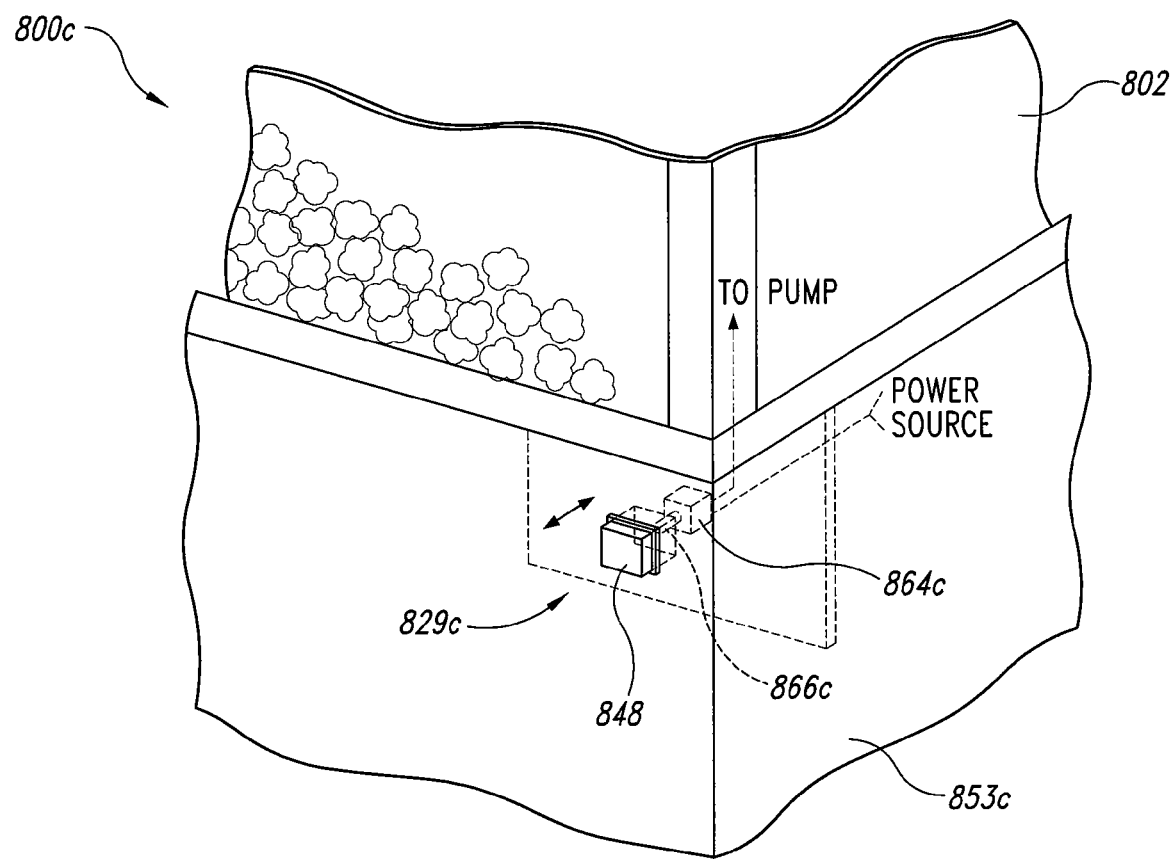

FIGS. 8A-8C are enlarged isometric views illustrating various pump actuation systems configured in accordance with embodiments of the invention. Each of these pump actuation systems can be incorporated into a corresponding popcorn machine 800 (identified individually as popcorn machines 800a-c, respectively) which can be at least generally similar in structure and function to one or more of the popcorn machines 100, 600 and 700 described in detail above. Referring first to FIG. 8A, a pump actuator 829a includes a foot pedal 828 extending from a base 853a of the popcorn machine 800a proximate to a floor surface 890. The foot pedal 828 is configured to pivot about a hinge 861. When depressed by an operator's foot, the foot pedal 828 moves downwardly and depresses a button 866a on a switch 864a. The switch 864a can be at least generally similar in structure and function to the switch 464 described above with reference to FIG. 4. Depressing the button 866a closes the switch and sends a corresponding signal to activate the pump (not shown in FIG. 8A). A coil spring or other biasing member 862 can return the foot pedal 828 to its initial starting position once the operator's foot has been removed.

Referring next to FIG. 8B, a pump actuator 829b includes a push bar 838 movably disposed on a base portion 853b of the popcorn machine 800b proximate to a cabinet 802. The push bar 838 can be configured to move toward the base 853b when depressed by a operator's hand, hip, knee or other body part. As the push bar 838 moves inwardly, a distal end 839 of the push bar 838 depresses a button 866b on a switch 864b. As described above, depressing the button 866b causes the switch 864b to send a corresponding signal to activate the pump and dispense a desired amount of topping onto popcorn held in a suitable serving container. One or more biasing members 872a, b can be used to return the push bar 838 to its initial position after use.

Referring next to FIG. 8C, in this embodiment the popcorn machine 800c includes a pump actuator 829c having a simple push button 848 for activating the topping pump. More specifically, depressing the push button 848 by hand or otherwise depresses a button 866c on a switch 864c, causing the switch 864c to send a corresponding signal to the pump as described above with regard to the other pump activation systems. The push button 848 can be positioned on the base 853c of the popcorn machine 800c, or at some other convenient location. As the foregoing discussion illustrates, there are numerous different ways for activating a pump or other fluid mover for dispensing popcorn topping into a serving container within a popcorn machine cabinet. Accordingly, the present disclosure is not limited to the particular embodiments illustrated in FIGS. 1-8C and described above.

Figure 9:
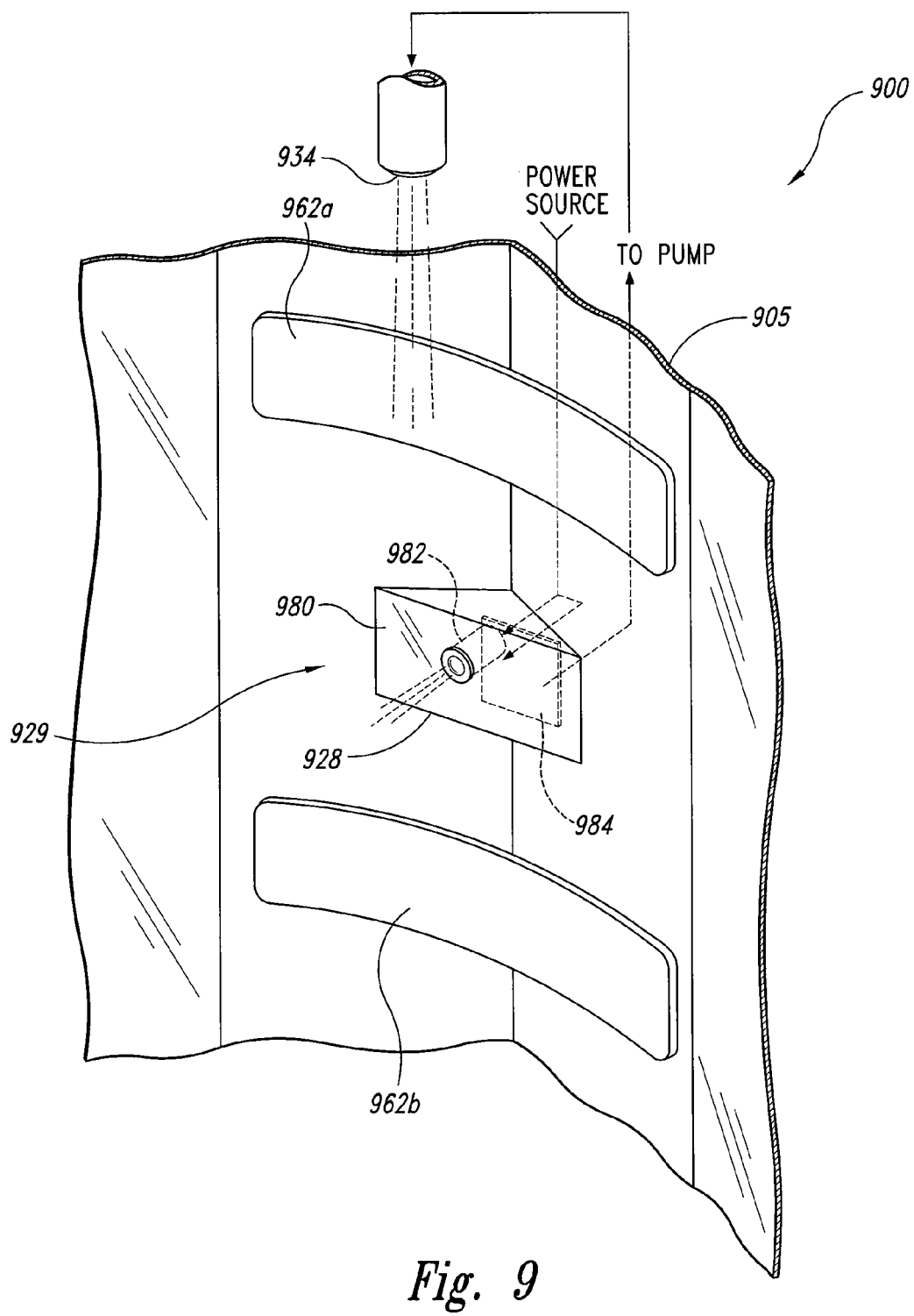
FIG. 9 is an enlarged isometric view of a topping pump actuation system configured in accordance with another embodiment of the invention.

FIG. 9 illustrates yet another system for activating a topping pump in accordance with an embodiment of the invention. More particularly, FIG. 9 is an enlarged isometric view of a portion (e.g., a corner portion) of a cabinet 902 of a popcorn machine 900 that is at least generally similar in structure and function to the various popcorn machines described in detail above. In this embodiment, however, the popcorn machine 900 includes a pump actuator 929 having a proximity switch 928 positioned at least generally below a topping dispenser outlet 934. In the illustrated embodiment, the proximity switch 928 includes a light source 982 (e.g., an infrared light source) and a photodetector 984 (e.g., a photodiode) positioned behind a transparent cover 980. In operation, the light source 982 sends out beams of invisible infrared light when energized. The light beams can reflect off of popcorn serving containers and other objects (not shown) and be received by the photodetector 984. The reflections enable the photodetector 984 to detect the presence of a serving container or other object positioned against guides 962a, b beneath a topping outlet 934. When a serving container is detected, the photodetector 984 sends a corresponding signal to activate the pump and dispense the topping onto the contents of the serving container. In one embodiment, proximity switch 928 can be configured to dispense topping for a preset period of time (e.g., about four or five seconds). In other embodiments, the proximity switch 928 can be configured to activate the pump and dispense topping for the duration of time that the serving container or other object is suitably positioned in the proximity of the proximity switch 928. Although the proximity switch 928 as described above is an infrared proximity switch, in other embodiments, other types of proximity switches can be used to activate the pump. Such switches can include, for example, acoustic, capacitive and/or inductive proximity switches and the like, as well as other proximity switches known in the art.

Figure 10:
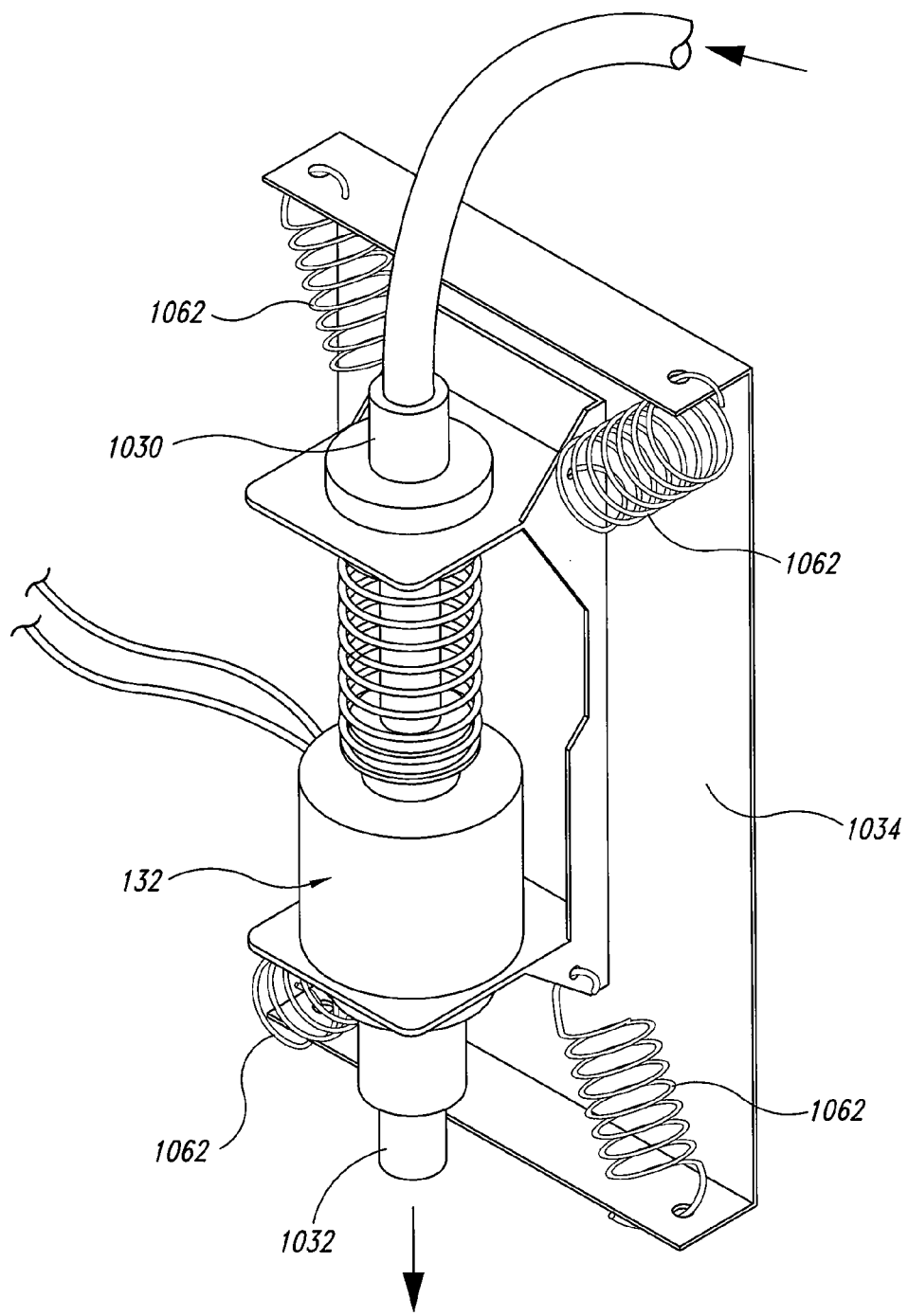
FIG. 10 is an enlarged isometric view of a topping pump for use with a topping dispensing system configured in accordance with an embodiment of the invention.

FIG. 10 is an enlarged isometric view of the topping pump 132 of FIG. 1, configured in accordance with one embodiment of the invention. In the illustrated embodiment, the pump 132 is an enclosed oscillating pump attached to a mounting plate 1034 by a plurality of spring members 1062 (e.g., coil springs). In one embodiment, the pump 132 can be a 17300 series pump (e.g., a 17300-105 high output oscillating pump, part no. 12862-F, rated at 115V and 50/60 Hz) provided by Gorman Rupp, Industries of 180 Hines Avenue, Bellville, Ohio 44813. In other embodiments, other types oscillating and non-oscillating type pumps can be used. The topping is drawn into the pump 132 via an inlet 1030 and is driven out of the pump 132 via an outlet 1032. In the embodiment of FIG. 1 described above, the pump inlet 1030 is operably coupled to the delivery tube 124, and the pump outlet 1032 is operably coupled to the dispensing tube 135. In this embodiment, the pump mounting plate 1034 can be fixedly attached to an interior surface of the cabinet top 154. As those of ordinary skill in the art will appreciate, however, there are a wide variety of different commercially-available pumps suitable for use in the various embodiments of topping dispensing systems described herein. Accordingly, any number of different pumps and other fluid moving devices can be used to move topping in the topping dispensing systems described herein without departing from the spirit or scope of the present disclosure.

Figure 11:
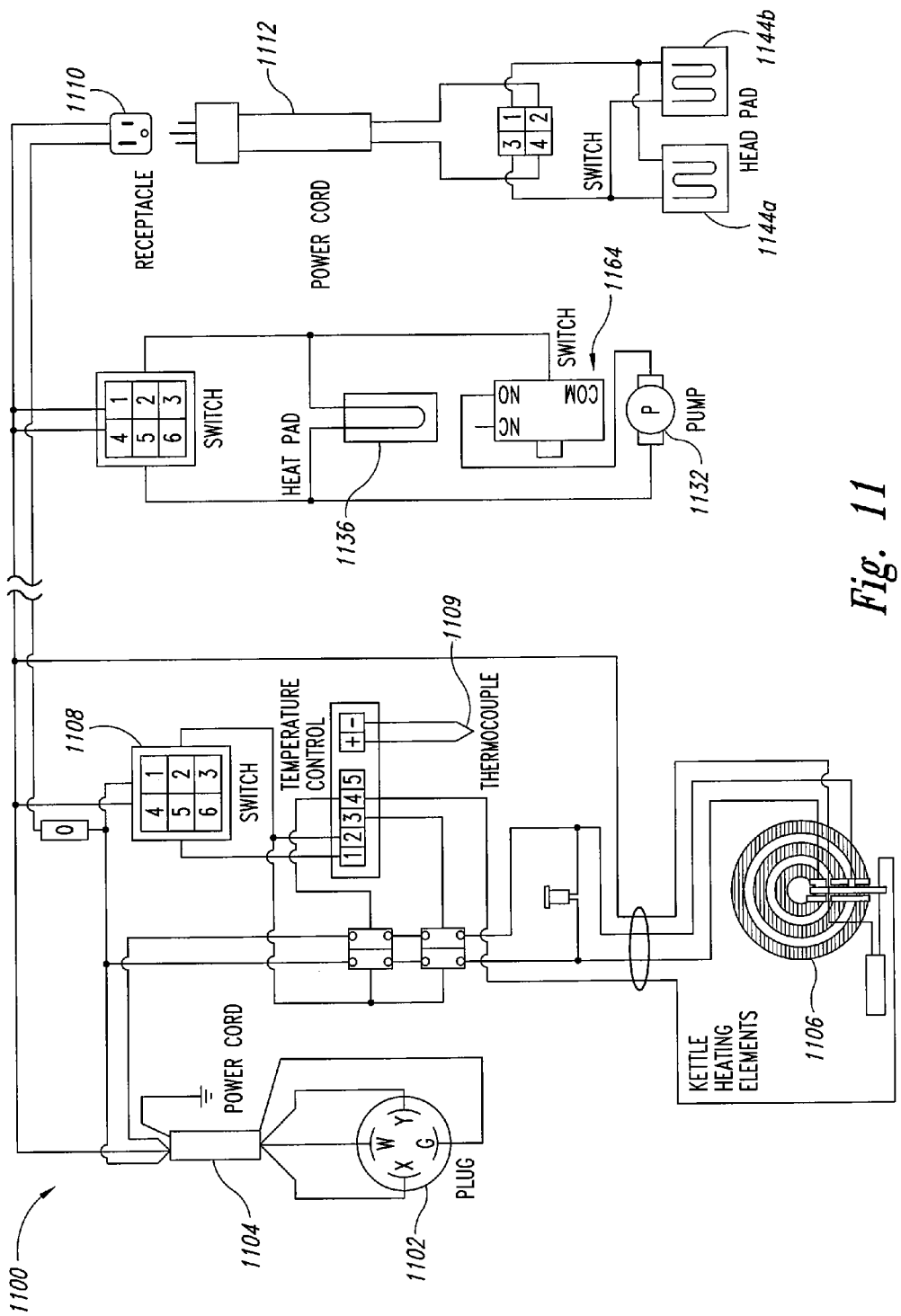
FIG. 11 is a schematic diagram of a portion of an electrical system of a popcorn machine having a topping dispensing system configured in accordance with an embodiment of the invention.

FIG. 11 is a schematic diagram of a portion of an electrical system 1100 of a popcorn machine having a topping dispensing system configured in accordance with an embodiment of the invention. For purposes of clarity, a number of the electrical components typically associated with popcorn machines are not illustrated in FIG. 11. Such components can include, for example, lighting systems, popping oil pumping systems, exhaust systems, kettle agitator systems, etc. The components of the electrical system 1100 schematically illustrated in FIG. 11 include a plug 1102 (e.g., a standard heavy-duty plug) configured to releasaby engage a facility power outlet (not shown). The plug 1102 provides power from the outlet to the electrically system 1100 via a power cord 1104. The power can be used to energize kettle heating elements 1106 in accordance with control inputs from a switch 1108. A thermocouple 1109 can modulate the temperature of the kettle heating elements 1106 to provide a suitable popping environment in the popping kettle (not shown).

The electrical system 1100 can also include a number of dispensing system components that are at least general similar in structure and function to the topping dispensing system components described above with reference to FIGS. 1-10. For example, the electrical system 1100 can include a topping pump 1132 operably connected to a switch 1164. In this embodiment, the pump 1132 can be at least generally similar in structure and function to the pump 132 described above with reference to, e.g., FIG. 10, and the switch 1164 can be at least generally similar in structure and function to the switch 464 described above with reference to, e.g., FIG. 4. In another aspect of this embodiment, a heating element 1136 is operably connected to the same power circuit as the switch 1164 and the pump 1132. The heating element 1136 can be at least generally similar in structure and function to the heating element 136 described above with reference to FIG. 1. More specifically, the heating element 1136 can be adhered to or otherwise operably coupled to the topping delivery tube 124 to warm the topping as it moves from a topping container (not shown) to the pump 1132.

The electrical system 1100 can also include one or more heat pads 1144 (identified individually as a first heat pad 1144*a* and a second heat pad 1144*b*) for warming one or more topping containers located in a lower portion of a popcorn machine, an upper portion of a popcorn machine, a cleanout drawer, or other location in, on, or around a popcorn machine. The heat pads 1144 can include electrically resistive heating elements that receive electrical power via a power cord 1112 which is operably connectible to a receptacle 1110 positioned inside the popcorn machine. Although FIG. 11 illustrates one embodiment of a possible arrangement of electrical components for use in the popcorn machines and topping dispensing systems described above, in other embodiments other electrical components and/or other configurations can be used with the systems and methods described herein without departing from the spirit or scope of the present disclosure.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A system for making popcorn, the system comprising:
 a cabinet having a see-through portion;
 means for popping un-popped corn in the see-through portion of the cabinet to produce popped corn;
 means for holding the popped corn in the see-through portion of the cabinet;
 an outlet positioned in the see-through portion of the cabinet and spaced apart from the means for popping un-popped corn;
 means for storing warm topping below the cabinet; and
 means for selectively dispensing topping from the outlet onto a serving of popped corn collected from the cabinet.

2. The system of claim 1 wherein the means for selectively dispensing topping are positioned at least partially within the cabinet.

3. A machine for making popcorn, the machine comprising:
 a cabinet having a popcorn-holding portion with one or more see-through panels for viewing popcorn held therein;
 a popping kettle positioned in the cabinet;
 a topping outlet positioned in the cabinet and spaced apart from the popping kettle;
 a topping holder configured to hold topping for application to popcorn after the popcorn has been popped in the popping kettle;
 a conduit operably extending at least partially between the topping holder and the topping outlet; and
 a pump operably connected to the conduit, wherein activation of the pump causes the pump to move topping through the conduit toward the topping outlet for dispensing onto popcorn taken from the cabinet and placed in a serving container, wherein the popcorn-holding portion includes at least two see-through panels joined by a corner member, and wherein at least a portion of the conduit is concealed behind the corner member as the topping conduit extends upwardly toward the topping outlet.

4. A popcorn machine comprising:
 a display case having a plurality of see-through panels extending at least partially between an interior base surface and a top;
 a popping apparatus positioned within the display case between the base surface and the top, wherein the popping apparatus is configured to heat un-popped corn and pop the corn to produce popcorn, wherein popcorn from the popping apparatus is stored on the base surface of the display case after popping for viewing from outside the popcorn machine via the see-through panels;
a topping outlet positioned in the display case between the base surface and the top, wherein the topping outlet is operably connectable in fluid communication with a topping container, and wherein the topping outlet is spaced apart from the popping apparatus to provide clearance for a popcorn serving container carrying a portion of popcorn to be manually positioned under the topping outlet;
a fluid mover configured to move topping from the topping container through the topping outlet and onto the portion of popcorn in the serving container in response to operator activation of the fluid mover; and
a heated passage operably connectable to the topping container and configured to extend at least partially between the topping container and the topping outlet.

5. The popcorn machine of claim 4 wherein the fluid mover includes a pump.

6. A popcorn machine comprising:
a display case having a plurality of see-through panels extending at least partially between an interior base surface and a top;
a popping apparatus positioned within the display case between the base surface and the top, wherein the popping apparatus is configured to heat un-popped corn and pop the corn to produce popcorn, wherein popcorn from the popping apparatus is stored on the base surface of the display case after popping for viewing from outside the popcorn machine via the see-through panels;
a topping outlet positioned in the display case between the base surface and the top, wherein the topping outlet is operably connectable in fluid communication with a topping container, and wherein the topping outlet is spaced apart from the popping apparatus to provide clearance for a popcorn serving container carrying a portion of popcorn to be manually positioned under the topping outlet;
a fluid mover configured to move topping from the topping container through the topping outlet and onto the portion of popcorn in the serving container in response to operator activation of the fluid mover, wherein the fluid mover includes a pump; and
a fluid conduit operably connectable to the topping container and configured to extend upwardly from the topping container along a corner portion of the cabinet toward the pump.

7. The popcorn machine of claim 6, further comprising:
a storage area positioned beneath the base surface; and
the topping container, wherein the topping container is removably positioned in the storage area.

8. The popcorn machine of claim 6 wherein the base surface is perforated, and wherein the popcorn machine further comprises: a heating system, wherein the heating system is configured to direct hot air upwardly through the perforated base surface to warm popcorn held thereon, and wherein the heating system is further configured to direct hot air toward the topping container to warm flavored topping held therein.

9. The popcorn machine of claim 6 wherein the base surface is perforated, and wherein the popcorn machine further comprises:
a storage area positioned beneath the perforated base surface;
the topping container, wherein the topping container is removably positioned in the storage area; and
a heating system positioned beneath the perforated base surface, wherein the heating system is configured direct hot air upwardly through the perforated base surface to warm popcorn held thereon, and wherein the heating system is further configured to direct hot air toward the topping container to warm flavored topping held therein.

10. The popcorn machine of claim 6 wherein the pump dispenses topping from the topping outlet in response to manual operation of a pump activation system positioned at least partially in the cabinet.

11. A machine for making popcorn, the machine comprising:
a cabinet having a popcorn-holding portion with one or more see-through panels for viewing popcorn held therein;
a popping kettle positioned in the cabinet;
a topping outlet positioned in the cabinet and spaced apart from the popping kettle;
a topping holder configured to hold topping for application to popcorn after the popcorn has been popped in the popping kettle;
a conduit operably extending at least partially between the topping holder and the topping outlet;
a pump operably connected to the conduit, wherein activation of the pump causes the pump to move topping through the conduit toward the topping outlet for dispensing onto popcorn taken from the cabinet and placed in a serving container; and
a pump activation system, wherein the pump activation system includes a manually operable switch positioned inside the cabinet.

12. The machine of claim 11, further comprising
a timer operably coupled to the switch, wherein operation of the switch activates the timer which limits activation of the pump to a preset period of time.

13. A machine for making popcorn, the machine comprising:
a cabinet having a popcorn-holding portion with one or more see-through panels for viewing popcorn held therein;
a popping kettle positioned in the cabinet;
a topping outlet positioned in the cabinet and spaced apart from the popping kettle;
a topping holder configured to hold topping for application to popcorn after the popcorn has been popped in the popping kettle;
a conduit operably extending at least partially between the topping holder and the topping outlet;
a pump operably connected to the conduit, wherein activation of the pump causes the pump to move topping through the conduit toward the topping outlet for dispensing onto popcorn taken from the cabinet and placed in a serving container; and
a push bar positioned beneath the topping outlet and operably connected to the pump, wherein movement of the push bar activates the pump.

14. The machine of claim 13 wherein the topping holder includes a heated shelf positioned beneath the popcorn-holding portion of the cabinet.

15. A machine for making popcorn, the machine comprising:
a cabinet having a popcorn-holding portion with one or more see-through panels for viewing popcorn held therein;
a popping kettle positioned in the cabinet;
a topping outlet positioned in the cabinet and spaced apart from the popping kettle;

a topping holder configured to hold topping for application to popcorn after the popcorn has been popped in the popping kettle;

a conduit operably extending at least partially between the topping holder and the topping outlet;

a pump operably connected to the conduit, wherein activation of the pump causes the pump to move topping through the conduit toward the topping outlet for dispensing onto popcorn taken from the cabinet and placed in a serving container; and an electrical heating element operably coupled to at least a portion of the topping conduit to heat topping moving therethrough during operation of the pump.

16. The machine of claim 15 wherein the popcorn-holding portion includes at least two see-through panels forming a corner region of the cabinet, and wherein the topping outlet is positioned in the corner region of the cabinet.

17. A machine for making popcorn, the machine comprising:

a cabinet having a popcorn-holding portion with one or more see-through panels for viewing popcorn held therein;

a popping kettle positioned in the cabinet;

a topping outlet positioned in the cabinet and spaced apart from the popping kettle;

a topping holder configured to hold topping for application to popcorn after the popcorn has been popped in the popping kettle, wherein the topping holder includes a heated shelf positioned beneath the popcorn-holding portion of the cabinet;

a conduit operably extending at least partially between the topping holder and the topping outlet;

a portable topping container carried on the heated shelf in fluid communication with the conduit; and a pump operably connected to the conduit, wherein activation of the pump causes the pump to move topping through the conduit toward the topping outlet for dispensing onto popcorn taken from the cabinet and placed in a serving container.

18. A method of serving popcorn with topping, the method comprising:

storing popcorn in a display case;

placing a portion of the popcorn from the display case in a serving container;

positioning the serving container at least generally underneath a flavoring dispenser positioned inside the display case;

activating a pump by depressing a switch via movement of the serving container to dispense flavoring from the flavoring dispenser onto the popcorn in the serving container; and removing the serving container and the popcorn therein from the display case.

19. The method of claim 18 wherein activating a pump includes activating an electric pump.

20. The method of claim 18 wherein depressing a switch via movement of the serving container includes pressing the serving container against a push bar.

21. The method of claim 18 wherein activating a pump includes activating a pump for a preset period of time.

* * * * *